United States Patent Office 2,804,054
Patented Aug. 27, 1957

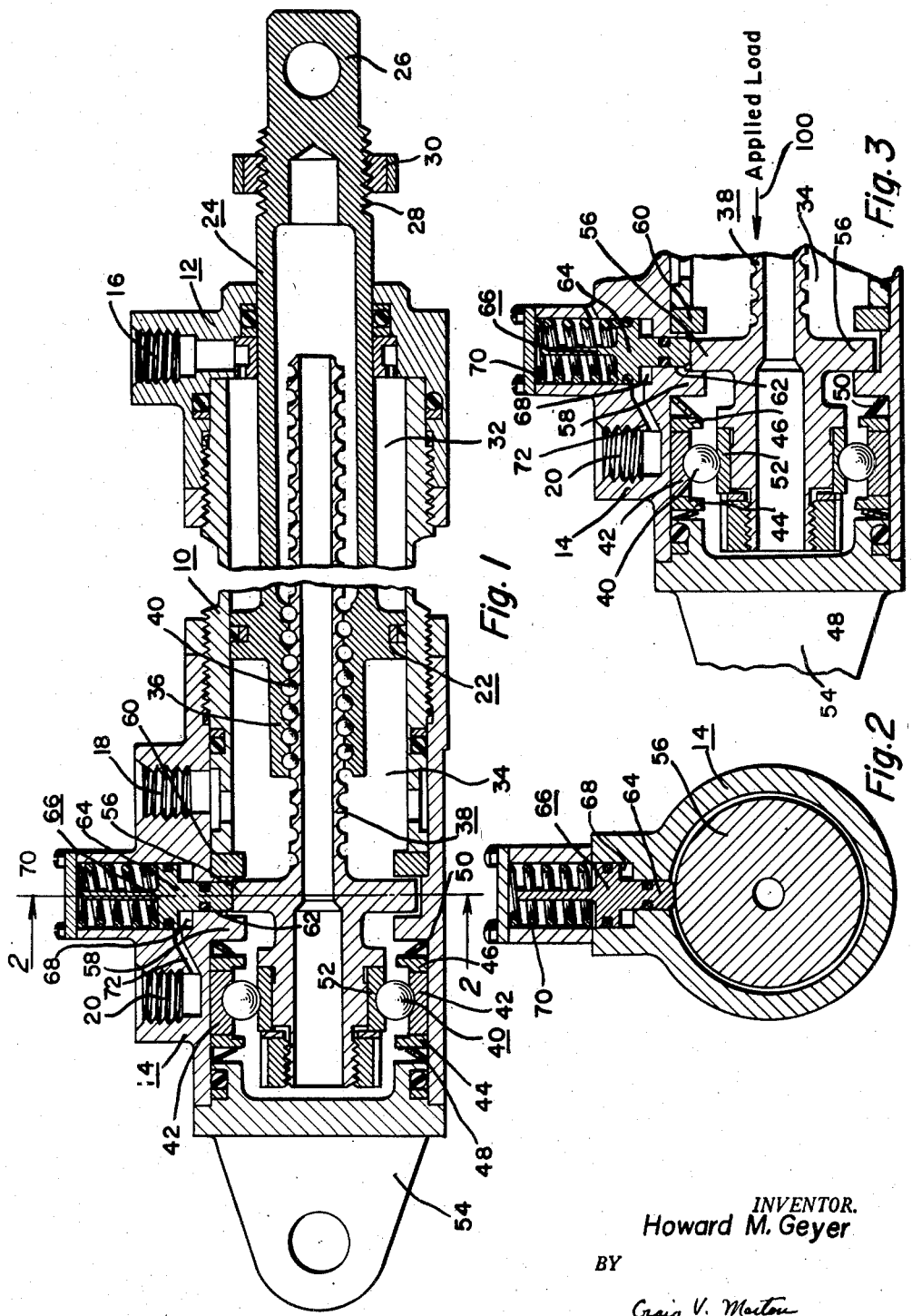

2,804,054

ACTUATOR AND LOCKING MEANS THEREFOR

Howard M. Geyer, Dayton, Ohio, assignor to General Motors Corporation, Detroit, Mich., a corporation of Delaware Application September 13, 1954, Serial No. 455,435

12 Claims. (Cl. 121—40)

This invention pertains to fluid pressure operated actuators, and particularly to self-locking fluid pressure operated actuators.

Heretofore, self-locking fluid pressure operated actuators, i. e., actuators of the type including a cylinder having disposed therein a reciprocable piston capable of fluid pressure actuation in both directions and including means for automatically locking the piston against movement in the absence of fluid pressure application thereto, have embodied various types of locking means, such as friction, roller and tooth type brakes. The actuator of this invention includes load sensitive brake means and constitutes an improvement over my copending application, Serial No. 423,180, filed April 14, 1954, wherein a plain bearing type brake is disclosed. Accordingly, among my objects are the provision of a fluid pressure operated actuator including load sensitive locking means; a further provision of an actuator including a reciprocable piston which is operatively connected to a rotatable member capable of limited axial movement for locking purposes; and the still further provision of an actuator including a small brake for controlling the operation of a large, load sensitive brake.

The aforementioned and other objects are accomplished in the present invention by incorporating a spring centered, ball bearing mounted screw shaft in the actuator, the screw shaft having an annular shoulder which constitutes a component of the load sensitive locking means. Specifically, the actuator comprises a cylinder having disposed therein a reciprocable piston capable of fluid pressure actuation in both directions. The piston is operatively connected to a rotatable member, or screw shaft which is rotatably supported within the actuator cylinder. In particular, the screw shaft is rotatably supported by ball bearing means which are spring centered so as to permit limited axial movement of the screw shaft.

The screw shaft is formed with a radially extending annular shoulder that is disposed between a pair of spaced annular shoulders within the actuator cylinder. The screw shaft is capable of axial movement so that the annular shoulder thereof may engage either of the annular shoulders of the cylinder. The complementary annular shoulders constitute plain bearing locking means which are load sensitive, as will be more particularly described hereinafter.

The actuator also includes a small brake comprising a spring biased plunger which may be moved into engagement with the periphery of the annular shoulder on the screw shaft. The plunger may be integral with a lock release piston which is capable of fluid pressure actuation in one direction, and spring actuation in the other direction. Preferably, although not necessarily, fluid pressure is applied to the lock release piston concurrently with the application of pressure fluid to either side of the actuator piston whereupon the small brake will be released. The small brake, constituted by the spring biased plunger is of itself insufficient to restrain rotation of the screw shaft. However, upon the discontinuance of pressure fluid application to the actuator cylinder and the lock release piston, the plunger will be moved into engagement with the screw shaft shoulder, the spring applies sufficient pressure thereto and effects sufficient braking torque of the screw shaft so as to cause the centering springs of the screw shaft to give way, thereby permitting the load to effect axial movement of the screw shaft. In this manner the annular shoulder on the screw shaft will engage one of the cylinder shoulders, and by reason of the size of the plain bearing surfaces in engagement, rotation of the screw shaft will be restrained. Since reciprocation of the piston is dependent upon rotation of the screw shaft, it will be appreciated that the actuator piston will be locked against movement by restraining rotation of the screw shaft.

Further objects and advantages of the present invention will be apparent from the following description, reference being had to the accompanying drawing wherein a preferred embodiment of the present invention is clearly shown.

In the drawing:

Fig. 1 is a fragmentary longitudinal sectional view of an actuator constructed according to this invention.

Fig. 2 is a sectional view taken along line 2—2 of Fig. 1.

Fig. 3 is a fragmentary sectional view of the actuator of Fig. 1 with the locking means engaged.

With particular reference to Fig. 1, the actuator comprises a cylinder 10 having exteriorly threaded portions adjacent both ends thereof. One end of the cylinder receives a tail cap assembly 12, and the other end of the cylinder receives a head cap assembly 14. The tail cap assembly 12 is formed with an opening 16, which constitutes a retract port for the actuator. The head cap assembly 14 is formed with an opening 18 constituting an extend port for the actuator, and is also formed with an opening 20 constituting a brake release port.

A reciprocable piston 22 is disposed within the cylinder 10, the piston being capable of fluid pressure actuation in both directions. As depicted in the drawing, the piston 22 includes an integral, longitudinally extending rod portion 24, which extends through an opening in the tail cap assembly 12. The free end portion of the rod 24 is formed as a fixture 26 by which means the piston rod may be attached to either a relatively movable load device, or a relatively fixed support, either of which will restrain rotation of the piston. The piston rod 24 also includes an external threaded portion 28, which receives a nut 30, the nut 30 being positioned to engage the end of tail cap assembly 12, thereby constituting a stop limiting movement of the piston 22 to the left, as viewed in Fig. 1.

Piston 22 divides the cylinder 10 into a retract chamber 32 and an extend chamber 34. The retract chamber 32 is connected by suitable passage means in the tail cap assembly 12 to the retract port 16, while the extend chamber 34 is connected by suitable passage means in the cylinder 10 to the extend port 18. Furthermore, as depicted in the drawing, the piston 22 is formed integral with a nut member 36, which is constrained for movement with the piston, the nut constituting a component of the well known ball-screw and nut coupling. Thus, the nut member 36 is formed with an internal spiral groove of semi-circular cross section. The nut threadedly engages a screw shaft 38, formed with a complementary external spiral groove of semi-circular cross section, through the agency of a plurality of circulating balls 40. A suitable circulating passage, not shown, for the balls 40 may be attached to the nut 36. Furthermore, while the nut member 36 is shown integral with the piston 22, it is readily apparent that the nut may be constituted by a separate member. Furthermore, the use of a ball, screw and nut coupling is only exemplary, and is not to be construed as a limitation.

The screw shaft, or rotatable member, 38 is rotatably mounted within the head cap assembly 14 by a ball bearing assembly 40. The outer race 42 of the ball bearing assembly is mounted between a pair of annular members 44 and 46, which are centered by a pair of Belleville springs 48 and 50. The inner race 52 of the ball bearing assembly 50 is suitably carried by the screw shaft 38. The head cap assembly 14 has attached thereto a fixture assembly 54 by which means the actuator cylinder may be attached to either a relatively fixed support or a relatively movable load device, either of which will restrain rotation of the cylinder.

The screw shaft 38 is also formed with a radially extending annular shoulder 56, which constitutes one component of the plain bearing type, load sensitive locking means, of this invention. It will be appreciated that by reason of the spring centering, the ball bearing means for rotatably supporting the screw shaft 38, and the screw shaft 38 will be capable of limited axial movement relative to the cylinder. Thus, the annular shoulder 56 of the screw shaft 38 is situated between an integral annular shoulder 58 of the head cap assembly 20 and an annular shoulder 60, which is held in fixed relation to the head cap assembly 20 by its connection with the cylinder 10. The head cap assembly 20 is formed with a radial opening 62 through which the end of a plunger, or piston rod, 64 extends. The end of the plunger 64 is arranged to engage the periphery of the annular shoulder 56.

The piston rod 64 may be integral with a lock release piston 66 disposed within a lock release cylinder 68 formed within the head cap assembly 14. The lock release piston 66 is capable of fluid pressure actuation upwardly, as viewed in Fig. 1, and spring actuation downwardly, as viewed in Fig. 1. Thus, coil compression spring 70 is disposed within the lock release cylinder 68 for normally urging the piston 66 downwardly in the absence of fluid pressure application thereto. The lock release cylinder 68 is connected by a passage 72 to the lock release port 20.

As set forth in the aforementioned copending application, Serial No. 423,180, it is a well known principle that the torque required to effect rotation between plain bearing members, is directly proportional to the normal applied load. Thus, as the normal applied load increases, the torque required to effect rotation likewise increases. In the present invention, the diameter of the plain bearing surfaces for restraining rotation of the screw shaft is larger than the maximum torque to which the screw shaft is subjected. Thus, the plain bearing assembly will act as a brake, which is load sensitive and will thereby be capable of restraining rotation of the screw shaft. Operation of the load sensitive locking means is controlled by the small brake constituted by the rod 64, which engages the periphery of the annular shoulder 56. This small brake by itself is insufficient to restrain rotation of the screw shaft 38. However, the small brake does impose sufficient braking torque on the screw shaft to allow the centering springs 48 and 50 to give way, thereby causing the screw shaft to move axially under the applied load whereby the annular shoulder 56 will engage either shoulder 58 or shoulder 60 so as to restrain rotation of the screw shaft and lock the actuator against further movement.

*Operation*

Operation of the actuator is as follows, assuming that the piston rod fixture 26 is attached to a movable load device and the cylinder fixture 54 is attached to a fixed support. Preferably, although not necessarily, the actuator will be controlled by valve means, not shown, which are operable to apply pressure fluid to either the retract port 16 or the extend port 18, and concurrently therewith apply fluid pressure to the brake release port 20. Similarly, the valve means will interrupt the application of pressure fluid to the brake release port 20 concurrently with the discontinuance of pressure application to either of the actuator control ports. Valve means of this character are disclosed in my copending application, Serial No. 394,660, filed November 27, 1953, now Patent No. 2,774,336. Assuming pressure fluid is directed to the retract port 16 and the lock release port 20, while the extend port 18 is connected to drain, the lock release piston will be moved upwardly, as viewed in Fig. 1, whereupon the rod portion 64 thereof will no longer engage the periphery of the annular shoulder 56. Accordingly, the centering springs 48 and 50 will center the ball bearing assembly 40 and the annular shoulder 56 whereupon the screw shaft 38 is free to rotate. Consequently, upon the application of pressure fluid to the retract chamber 32, while the extend chamber 34 is connected to drain, the piston 22 will move to the left, as viewed in Fig. 1, it being understood that movement of the piston 22 will effect rotation of the screw shaft 38.

When the application of fluid pressure to the retract chamber 32 and the lock release cylinder 68 is interrupted by the valve means, not shown, the compression spring 70 will move the piston 66 so that the rod portion 64 thereof engages the periphery of the annular shoulder 56. In this manner, a resistive torque load is imposed upon the screw shaft 38. This resistive torque load, while insufficient to restrain rotation of the screw shaft, is sufficient to cause one or the other of the centering springs 48 and 50 to give way. Assuming the applied load is in the direction of arrow 100 in Fig. 3, the screw shaft 38 will move axially to the left from the position of Fig. 1 to the position of Fig. 3 wherein the annular shoulder 56 of the screw shaft will engage the annular shoulder 58 of the head cap assembly 14. In this manner, the plain bearing surfaces will be overloaded, thereby restraining rotation of the screw shaft. Thus, the actuator piston is locked against movement by the locking means, which are load sensitive, and this phenomenon occurs whenever fluid pressure is not being applied to either of the cylinder chambers, and irrespective of the position of the piston within the cylinder.

While the embodiment of the present invention as herein disclosed, constitutes a preferred form, it is to be understood that other forms might be adopted.

What is claimed is as follows:

1. A fluid pressure operated actuator including, a cylinder having disposed therein a reciprocable piston capable of fluid pressure actuation in both directions, a member rotatably supported in said cylinder and operatively connected with said piston such that movement of said piston is dependent upon rotation of said member, and releasable locking means operatively associated with said member for preventing rotation thereof and capable of preventing movement of said piston in either direction, said locking means being load sensitive whereby the locking effort is proportional to the applied actuator load.

2. A fluid pressure operated actuator including, a cylinder having disposed therein a reciprocable piston capable of fluid pressure actuation in both directions, a member rotatably supported in said cylinder and operatively connected with said piston such that movement of said piston is dependent upon rotation of said member, locking means operatively associated with said member for preventing rotation thereof and capable of preventing movement of said piston in either direction, said locking means being load sensitive whereby the locking effort is proportional to the applied actuator load, and means for releasing said locking means so as to permit rotation of said member and reciprocation of said piston.

3. A fluid pressure operated actuator including, a cylinder having disposed therein a reciprocable piston capable of fluid pressure actuation in both directions, a member rotatably supported in said cylinder and operatively connected with said piston such that movement of said piston is dependent upon rotation of said member, said member being supported for limited axial movement relative to said cylinder, means for applying a resistive torque load to said rotatable member so as to cause the applied actuator load to effect axial movement of said rotatable member, and means engageable with said rotatable member upon axial movement thereof in either direction for restraining rotation of said member so as to lock said piston against movement.

4. The combination set forth in claim 3 wherein said member is rotatably supported by a ball bearing assembly, the outer race of which is spring centered within the actuator cylinder.

5. The combination set forth in claim 3 wherein the means for applying the resistive torque load on said rotatable member comprises a plunger capable of spring actuation in one direction and fluid pressure actuation in the other direction.

6. The combination set forth in claim 3 wherein said rotatable member includes an annular shoulder situated between a pair of internal annular shoulders attached to said cylinder, and wherein the means engageable with said rotatable member for restraining rotation thereof constitutes one of said cylinder attached annular shoulders.

7. A fluid pressure operated actuator including in combination, a cylinder, a reciprocable piston disposed in said cylinder capable of fluid pressure actuation in both directions, a rotatable member disposed in said cylinder and operatively connected with said piston such that piston reciprocation is dependent upon and effects rotation of said member, spring centered bearing means rotatably supporting said member within said cylinder whereby said member is capable of limited axial movement relative to said cylinder under applied actuator load, said member including an annular shoulder, means for applying a resistive torque load to said annular shoulder so as to cause said centering springs to give way under the applied actuator load, and means engageable with said annular shoulder upon axial movement of said member for restraining rotation of said member.

8. The combination set forth in claim 7 wherein the means for applying resistive torque load to said annular member comprises a plunger capable of spring actuation into engagement with the periphery of said annular shoulder and capable of fluid pressure actuation out of engagement with said annular shoulder.

9. The combination set forth in claim 7 wherein the means for supporting said member for rotation comprises a ball bearing assembly, the outer race of which is normally centered by a pair of Belleville springs.

10. The combination set forth in claim 7 wherein the means engageable with said annular shoulder comprises either of a pair of spaced annular shoulders which are attached to said cylinder.

11. An actuator assembly including in combination, a cylinder, a reciprocable piston disposed in said cylinder, a member rotatably supported in said cylinder and operatively connected with said piston such that piston reciprocation is dependent upon and effects rotation of said member, and releasable locking means operatively associated with said rotatable member for restraining rotation thereof when the actuator is inactive and capable of preventing movement of said piston in either direction, said locking means being load sensitive whereby the locking effort is proportional to applied actuator load.

12. An actuator assembly including in combination, a cylinder, a reciprocable piston in said cylinder, a member rotatably supported in said cylinder and operatively connected to said piston such that piston reciprocation is dependent upon and effects rotation of said member, said member being capable of limited axial movement relative to said cylinder under applied actuator load, means for imposing a resistive torque load on said member so as to cause said member to move axially under the applied actuator load, and means engageable with said member when said member has moved axially under the applied actuator load for restraining rotation of said member, said restraining effort being proportional to the applied actuator load.

References Cited in the file of this patent

UNITED STATES PATENTS

| | | |
|---|---|---|
| 2,205,346 | Clench | June 18, 1940 |
| 2,523,053 | Obrist | Sept. 19, 1950 |

FOREIGN PATENTS

| | | |
|---|---|---|
| 644,424 | Great Britain | Oct. 11, 1950 |